US012794344B2

(12) United States Patent
Du et al.

(10) Patent No.: US 12,794,344 B2
(45) Date of Patent: Nov. 10, 2026

(54) PHASE REASSIGNMENT BETWEEN POWER CONVERTERS

(71) Applicant: Apple Inc., Cupertino, CA (US)

(72) Inventors: Dingkun Du, Santa Clara, CA (US); Balaji Virajpet, San Jose, CA (US); Hao Zhou, San Jose, CA (US); Hubert Attah, Santa Clara, CA (US); Jitendra K. Agrawal, Fremont, CA (US)

(73) Assignee: Apple Inc., Cupertino, CA (US)

( * ) Notice: Subject to any disclaimer, the term of this patent is extended or adjusted under 35 U.S.C. 154(b) by 321 days.

(21) Appl. No.: 18/443,501

(22) Filed: Feb. 16, 2024

(65) Prior Publication Data

US 2025/0112541 A1 Apr. 3, 2025

Related U.S. Application Data

(60) Provisional application No. 63/586,539, filed on Sep. 29, 2023.

(51) Int. Cl.

*H02M 1/00* (2006.01)
*H02M 1/08* (2006.01)
*H02M 3/158* (2006.01)

(52) U.S. Cl.

CPC ............. *H02M 1/008* (2021.05); *H02M 1/08* (2013.01); *H02M 3/1584* (2013.01)

(58) Field of Classification Search

CPC ....... H02M 1/008; H02M 1/08; H02M 3/1584
See application file for complete search history.

(56) References Cited

U.S. PATENT DOCUMENTS

| | | | | |
|---|---|---|---|---|
| 6,215,290 | B1 | 4/2001 | Yang et al. | |
| 6,600,296 | B2 | 7/2003 | Hazucha | |
| 6,850,045 | B2 | 2/2005 | Muratov et al. | |
| 7,692,329 | B2 | 4/2010 | Qahouo et al. | |
| 10,126,791 | B2 * | 11/2018 | Beeston | G06F 1/28 |
| 11,594,961 | B2 | 2/2023 | Tschirhart et al. | |
| 2018/0302077 | A1 * | 10/2018 | Navarro Castillo | H03K 7/08 |
| 2021/0036596 | A1 * | 2/2021 | Jeon | H02M 3/1584 |
| 2021/0257909 | A1 * | 8/2021 | Roessig | H02M 3/1584 |
| 2021/0320590 | A1 * | 10/2021 | Ng | H02M 3/1584 |
| 2023/0031911 | A1 * | 2/2023 | Salus | H02M 3/158 |
| 2023/0095471 | A1 * | 3/2023 | Shaikh | H02M 3/1584 323/271 |

* cited by examiner

*Primary Examiner* — Jeffrey A Gblende
*Assistant Examiner* — Jye-June Lee
(74) *Attorney, Agent, or Firm* — Kowert, Hood, Munyon, Rankin & Goetzel, P.C.; Gentry C. McLean; Dean M. Munyon

(57) ABSTRACT

Phase reassignment among power converters is disclosed. Multi-phase power converters of a plurality are arranged such that the various phases of each can be shared. When a given power converter has a high demand current and a phase of another power converter in the same group is currently unused, that phase may be borrowed by the given power converter to meet the demand current. The power converter that borrows a phase from another power converter is designated as the leader, while the borrowed phase is designated as a follower. The regulated supply voltage is determined by the leader power converter, irrespective of the regulated output voltage to be generated by the power converter from which another phase is borrowed.

20 Claims, 11 Drawing Sheets

PHASE REASSIGNMENT BETWEEN POWER CONVERTERS

PRIORITY CLAIM

The present application claims priority to U.S. Provisional Application No. 63/586,539, entitled "Phase Reassignment Between Power Converters," filed Sep. 29, 2023, the disclosure of which is incorporated by reference herein in its entirety.

BACKGROUND

Technical Field

This disclosure is directed to electronic circuits, and more particularly, power converter circuits.

Description of the Related Art

Modern computer systems may include multiple circuits blocks designed to perform various functions. For example, such circuit blocks may include processors, processor cores configured to execute software, or program instructions. Additionally, the circuit blocks may include memory circuits, mixed-signal or analog circuits, and the like.

In some computer systems, the circuit blocks may be designed to operate using different power supply voltage levels. For example, in some computer systems, power management circuits (also referred to as "power management units") may generate and monitor various power supply signals.

Power management circuits often include one or more power converter circuits configured to generate regulated voltage levels on respective power supply signal lines using a voltage level of an input power supply signal. Such converter circuits may employ multiple reactive circuit elements such as inductors, capacitors, and the like. Some of these power converters may be multi-phase power converters. Control circuits for such power converters may activate and deactivate phases in accordance with demand current from one or more load circuits.

SUMMARY

Phase reassignment among multi-phase power converters is disclosed. In one embodiment, a plurality of multi-phase power converters includes a first power converter having a first plurality of phases and a second power converter having a second plurality of phases. Switching circuits are coupled to each of the first and second plurality of phases. A phase assignment is configured to reassign one or more selected ones of the first plurality of phases to provide a portion of an output current generated by the second power converters, and further configured to reassign one or more selected ones of the second plurality of phases to provide a portion of an output current generated by the first power converter.

Generally speaking, the disclosure contemplates a plurality of multi-phase power converters in which the various phases of each can be shared. When a given power converter has a high demand current and a phase of another power converter in the same group is currently unused, that phase may be borrowed by the given power converter to meet the demand current. The power converter that borrows a phase from another power converter is designated as the leader, while the borrowed phase is designated as a follower. The regulated supply voltage is determined by the leader power converter, irrespective of the regulated output voltage to be generated by the power converter from which another phase is borrowed.

BRIEF DESCRIPTION OF THE DRAWINGS

The following detailed description makes reference to the accompanying drawings, which are now briefly described.

DETAILED DESCRIPTION OF EMBODIMENTS

Figure 1:
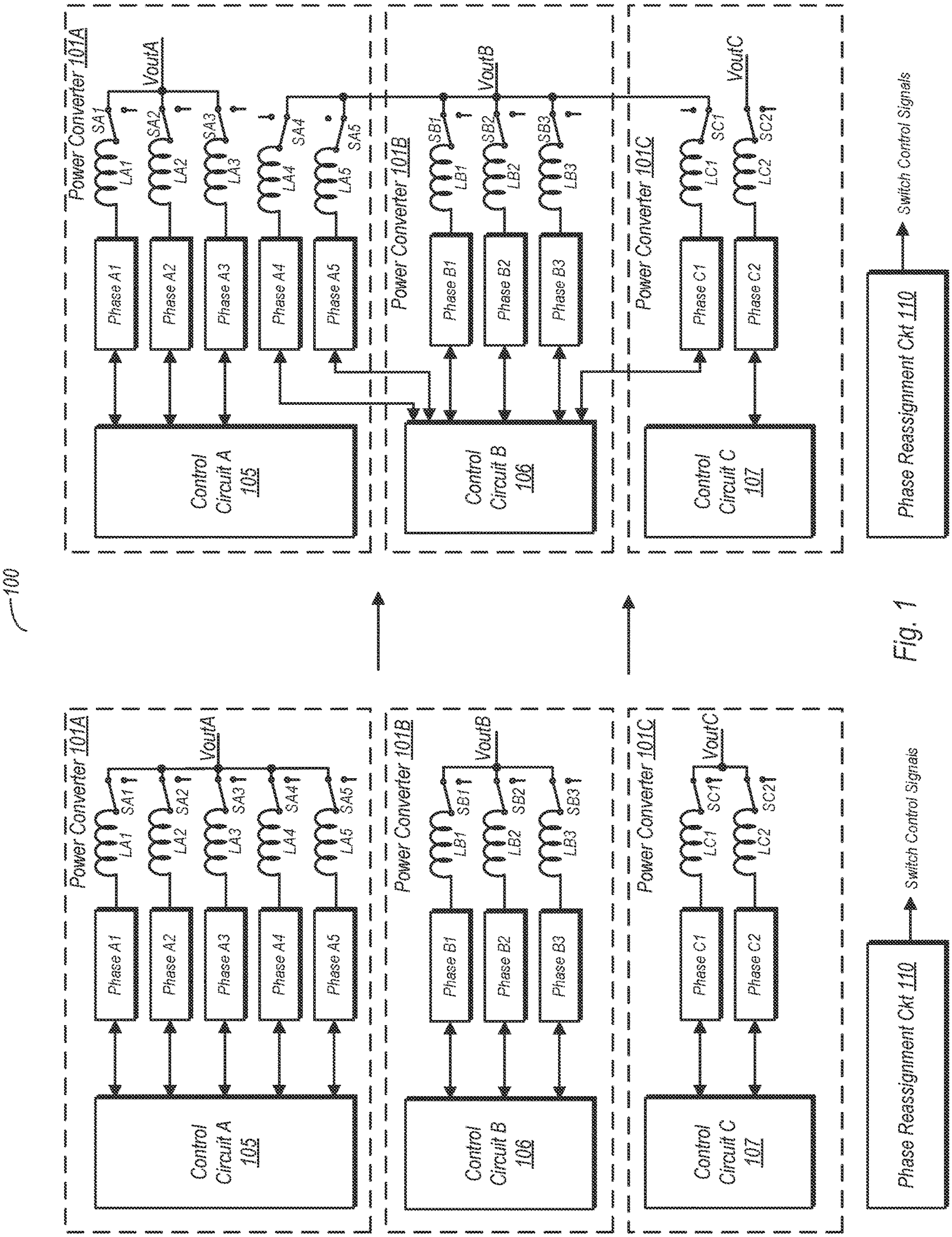
FIG. 1 is a diagram illustrating one embodiment of a plurality of power converters configured for phase sharing.

Many electronic systems need multiple power converters to provide for different supply voltage needs. Multi-phase power converters are often used, and several of these may be implemented on the same IC/die. However, chip area is limited, which in turn limits the design (e.g., the number of phases) that can be implemented in a given power converter. Furthermore, the various power converters may have different usage requirements, with some requiring more use than others. With limited space and different usage requirements, it is often difficult to meet the design requirements of various power converters.

The present disclosure makes use of the insight that, if currently unused phases of a power converter could be "borrowed" by another power converter, problems arising from the limited area and corresponding limited designs could be minimized. Accordingly, the present disclosure is directed to multi-phase power converters configured to allow sharing of phases with one another. In particular, within a group of multi-phase power converters, unused or currently unneeded phases of one power converter can be assigned to another power converter that has a need to provide extra output current. This may be performed even if the power converters are configured to provide different output voltages.

A controller for a power converter for which a phase is borrowed from another power converter may be referred to as a lead controller, while the borrowed phase may be referred to as a follower. Multiple phases may be borrowed by a given power converter. The lead controller may provide an indication of a demand current, via a demand current bus, to all phases in use by that power converter, including any follower phases. The demand current may be generated based on a difference between a reference voltage and a current output voltage of that power converter. The demand current may be used to determine the amount of current sent to the load by all phases operating under control of the lead controller.

Each phase includes a current sense amplifier arranged to sense the inductor current. The value of this inductor current may be provided, by a sense current bus, to a sense current receiver of the lead controller. The lead controller may use the total sense current from all phases assigned thereto to determine the number of phases needed to enable regulation of the output voltage at its desired level.

A phase reassignment circuit may receive phase demand information for each of the power controllers and reassign phases based on need and availability. In reassigning phases to a different power converter than their own, the phase reassignment circuit may generate signals provided to switching circuits to make the appropriate connections of phases to the leader controller via the demand current bus and the sense current bus. The phase reassignment circuit may also keep track of which phases are assigned to which converter in phase assignment register. These registers may be updated as phase assignments change during operation.

In one embodiment, an integrated circuit may include a number of power converters. The power converters may be arranged into groups, or clusters, based on their physical proximity to one another. Within a given cluster, phases may be reassigned from their original converter to another converter in the same cluster. Accordingly, each cluster may include its own demand current bus, sense current bus, and phase reassignment circuit. It is noted that, within a cluster, the power converters for which phases can be re-assigned are not necessarily configured to provide the same regulated output voltages. As such, a phase reassigned from a first power converter to a second power converter may nevertheless provide current for the second power converter, even if the regulated output voltage of the first power converter is a different value. The output voltage of a given power converter may thus be determined by its own control circuitry, irrespective of any additional phases it might be using from other power converters.

The arrangement disclosed herein may provide reusability of phases of a power converter. This in turn may allow for significant improvements in both design and operational flexibility.

Various embodiments of a system enabling the sharing of phases among a plurality of multi-phase power converters are now discussed in further detail below. The discussion begins with a discussion of an arrangement of multiple power converters with sharable phases, with a demonstration of phase sharing there between. An example power converter and phase according to the disclosure are also described. Thereafter, the discussion continues with a focus on analog buses used in an embodiment of a system according to the disclosure. A phase reassignment circuit is then described, followed by a description of an integrated circuit with clusters of multi-phase power converters with sharable phases. An example device, example applications, and a computer readable medium for manufacturing a circuit according to the disclosure are also described.

System with Multi-Phase Power Converters Having Shareable Phases:

FIG. 1 is a diagram illustrating one embodiment of a plurality of power converters configured for phase sharing. In the embodiment shown, the three power converters of power delivery system 100, power converter A, power converter B, and power converter C, are multi-phase power converters. Power converter 101A includes five phase circuits (or phases), power converter 101B includes three phases, and power converter 101C includes two phases. Each of the power converters is a switching power converter, and each of the phases includes its own switching circuitry. In one embodiment, each of the power converters is a buck converter, and each phase includes a high side switch and a low side switch coupled at a switching node, which in turn is coupled to a corresponding inductor. Power converters 101A, 101B, and 101C are configured to generate regulated supply voltages VoutA, VoutB, and VoutC, respectively. A phase reassignment circuit 110 is coupled to provide switch control signals. Using the switch control signals, phase reassignment circuit 110 may assign the phases among them based on various factors.

A corresponding switch is coupled between the inductor of each phase and its output voltage node. For example, switch SA1 is coupled between VoutA and inductor LA1 of phase A1, switch SA2 is coupled between VoutA and inductor LA2 of Phase A2, and so on. Each of the switches shown in the illustrated embodiment may be used to cause a given phase to provide an output current for its own phase, or for another one of the phases in power delivery system 100. It is noted that while the switches shown in FIG. 1 are single-pole, double-throw switches, this illustration is not intended to be limiting and is instead provided for the sake of simplicity. In practice, the particular type of switches used may be arranged to couple any of the phase circuits of power delivery system 100 to provide output current for any one of the power converters 101A-C.

On the left-hand side of the drawing, each of the phases is coupled to communicate with its corresponding control circuit. For example, phases A1-A5 are each coupled to communicate with control circuit A 105. Although not explicitly shown here, additional switches may be provided to allow phase circuits of a given power converter 101 to be coupled to control circuits of other power converters during phase reassignment. Each control circuit may generate demand current information to be provided to its respectfully coupled phases. Each of the phases may use the demand current information to determine its operating parameters, such as switching mode, switching frequency, and duty cycle. In one embodiment, each of the phases may be configured to operate using pulse frequency modulation (PFM) or pulse width modulation (PWM). Accordingly, each phase may vary its switching frequency, pulse width (duty cycle), and/or mode (PFM or PWM). Each of the phases may also include a current sense amplifier, which senses the current through its correspondingly coupled inductor. The sense current information may be sent back to the control circuit to which it is coupled.

On the right-hand side of the drawing, some of the phases have been reassigned to power converters other than their original. In this example, phases A4 and A5 of power converter A have been assigned to operate with power converter B via switches SA4 and SA5, respectively. Similarly, phase C1 of power converter C is also assigned to operate with power converter B via switch SC1. Including its three original phases, a total of six phases are operating with power converter B in this example. This phase reassignment may be carried out under control of the phase reassignment circuit 110, and may be based on phase demands indicated by the control circuits of each of the power converters. During phase reassignment, the phase reassignment circuit 110 may generate switch control signals to cause the phases of the various power converters to be coupled to other ones of the power converters, such as shown here with extra phases being assigned to power converter 101B.

When phases A4, A5, and C1 are assigned to power converter B in this example, each receives an indication of demand current from control circuit B. Accordingly, these phases may operate using a mode and operating parameters that allow them to contribute some desired amount of output current to power converter B. Similarly, each of phases A4, A5, and C1 in this example provide information indicative of their respective inductor current to control circuit B. The demand current and inductor current information may be conveyed by a demand current bus and a sense current bus, respectively, both of which are analog buses. These buses will be discussed in further detail below.

It is noted that the particular configuration shown on the right-hand side of FIG. 1 is but one possible example of an arrangement in which some phases are reassigned. The disclosure contemplates that any of the phases of the three power converters can be assigned to any one of the power converters, including its own, original power converter. Thus, for example, either phase of power converter C could be assigned to operate with power converter B or power converter A, in addition to its own converter. It is further noted that, while the output voltages VoutA, VoutB, and VoutC may be different, the output voltage is determined by the controller or the leader power converter irrespective of which phases with which it is operating. Thus, even though, in this example, power converter B is using phases from power converter A and power converter C, its output voltage nevertheless remains as VoutB. Thus, follower phases that are reassigned to power converters other than their own primarily contribute a current to the leader power converter, which thus enables it to regulate its intended output voltage.

In some embodiments, phase reassignment circuit 110 may also disable control circuits of the various ones of power converters 101. For example, if both phases of power converter 101C are assigned to another one of power converters 101A/101B, then control circuit C 107 may be disabled by phase reassignment circuit 110. Upon returning one or both of phases C1 and/or C2 to power converter 101C, phase reassignment circuit 110 may re-enable control circuit C 107.

Figure 2A:
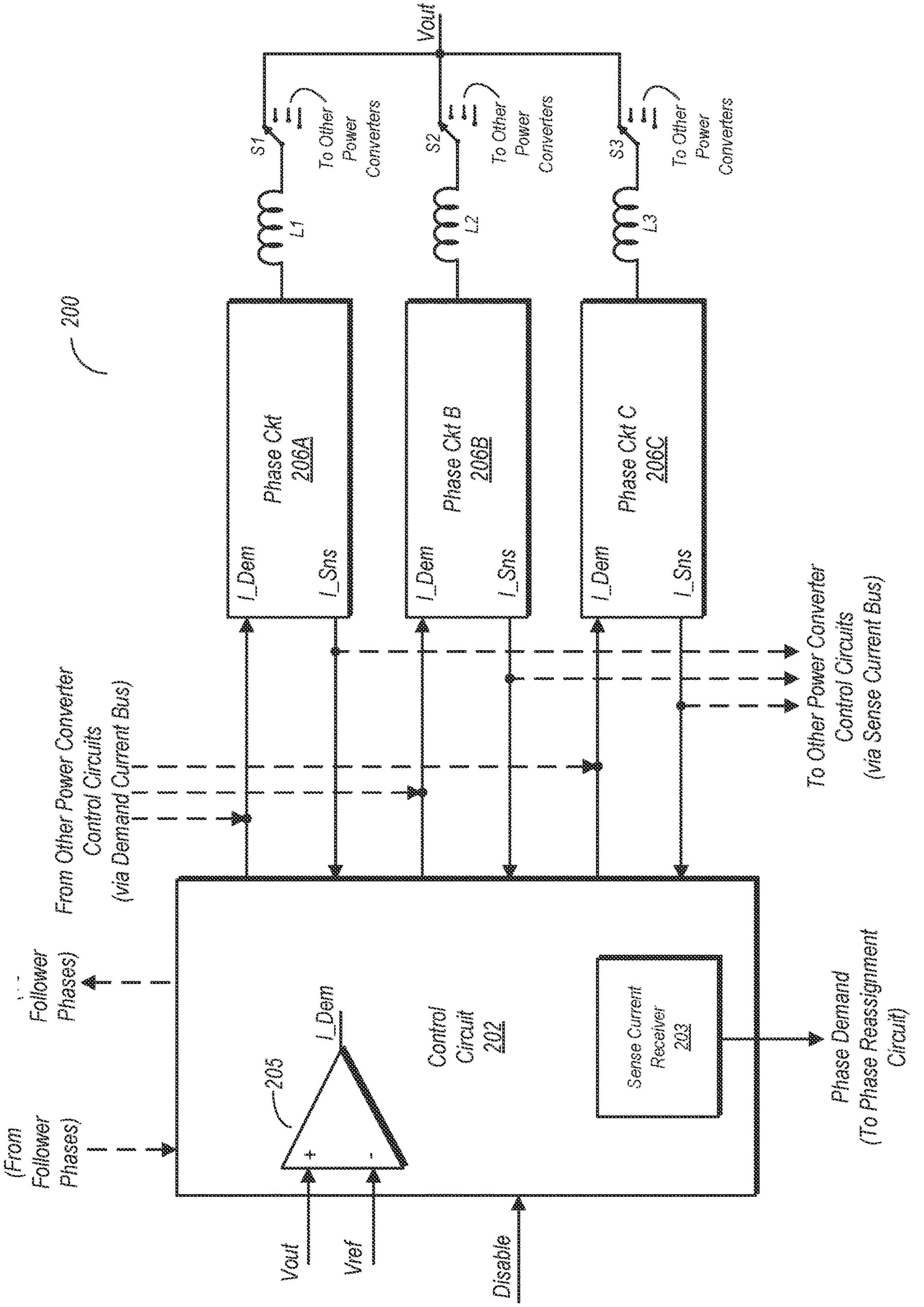
FIG. 2A is a diagram illustrating one embodiment of a power converter configured for sharing phases with other power converters.

Power Converter and Phase Example:

FIG. 2A is a diagram illustrating one embodiment of a power converter configured for sharing phases with other power converters. In the embodiment shown, power converter 200 includes a control circuit and three phases, phase 206A, phase 206B, and phase 206C. Inductors L1-L3 are associated with phase circuits 206A-206C, respectively, as are switches S1-S3.

Control circuit 202 includes amplifier 205 configured to generate a demand current value, I_Dem, based on a comparison of the output voltage generated by power converter 200, Vout, and a reference voltage, Vref, which is used to indicate the desired output voltage. The demand current may vary with the difference between these two values. The demand current value output from amplifier 205 may be provided to each and every phase operating with power converter 200, including any follower phases reassigned thereto from another power converter. Although power converter 200 in the embodiment shown includes three phase circuits 206, it is noted that this number may be different, such as in the example of FIG. 1 which also includes power converters with five and two phase circuits.

Control circuit 202 also includes sense current receiver 203, which is coupled to receive information regarding sensed inductor currents for each phase operating with power converter 200, including follower phases reassigned thereto from another power converter. Sense current receiver 203 may sum the sensed currents to determine the number of phases needed to provide the desired regulation at the specified output voltage. For example, if the demand current, as indicated by I_dem, is significantly greater than the sense current summed by sense current receiver 203, power converter 200 may need additional phases to obtain the desired regulation. In response to this condition, sense current receiver 203 may send one or more phase demand signals to the phase reassignment circuit (not shown here) indicating that it needs additional phases to maintain regulation. The information conveyed by sense current receiver 203 may also indicate the difference between the summed sense current values and the demand current, which can be used by the phase reassignment circuit to determine a type and number of additional phase circuits to be assigned to power converter 200.

Each of the phase circuits 206 in the embodiment shown may receive the demand current value from a control circuit of a power converter with which it is operating. As shown here, each phase circuit 206 may receive a demand current value from control circuit 202 when not reassigned to another power converter. When reassigned to another power converter, a given phase circuit 206 may receive a demand current from the control circuit of that power converter, via a demand current bus, which is discussed in further detail below.

Each of the circuits 206 in the embodiment shown may also provide a sense current value to a control circuit of a power converter with which it is operating. As shown in FIG. 2A, each phase circuit 206 may provide a sense current value to control circuit 202 when not reassigned to another power converter. When reassigned to another power converter, a given phase circuit 206 may provide the sense current value to the control circuit of that power converter. The sense current value may be conveyed to the control circuit of another power converter via a sense current bus, which is also discussed in further detail below.

Switches S1-S3 in the embodiment shown may be operated by corresponding switch control signals generated by a phase reassignment circuit. The default position for these switches is that the phase circuits 206 may be assigned to power converter 200 as shown in FIG. 2A. However, these phase circuits 206 may be assigned to other power converters, by a phase reassignment circuit, when the other power converters have a high demand current while the demand current for power converter 200 is relatively low.

Figure 2B:
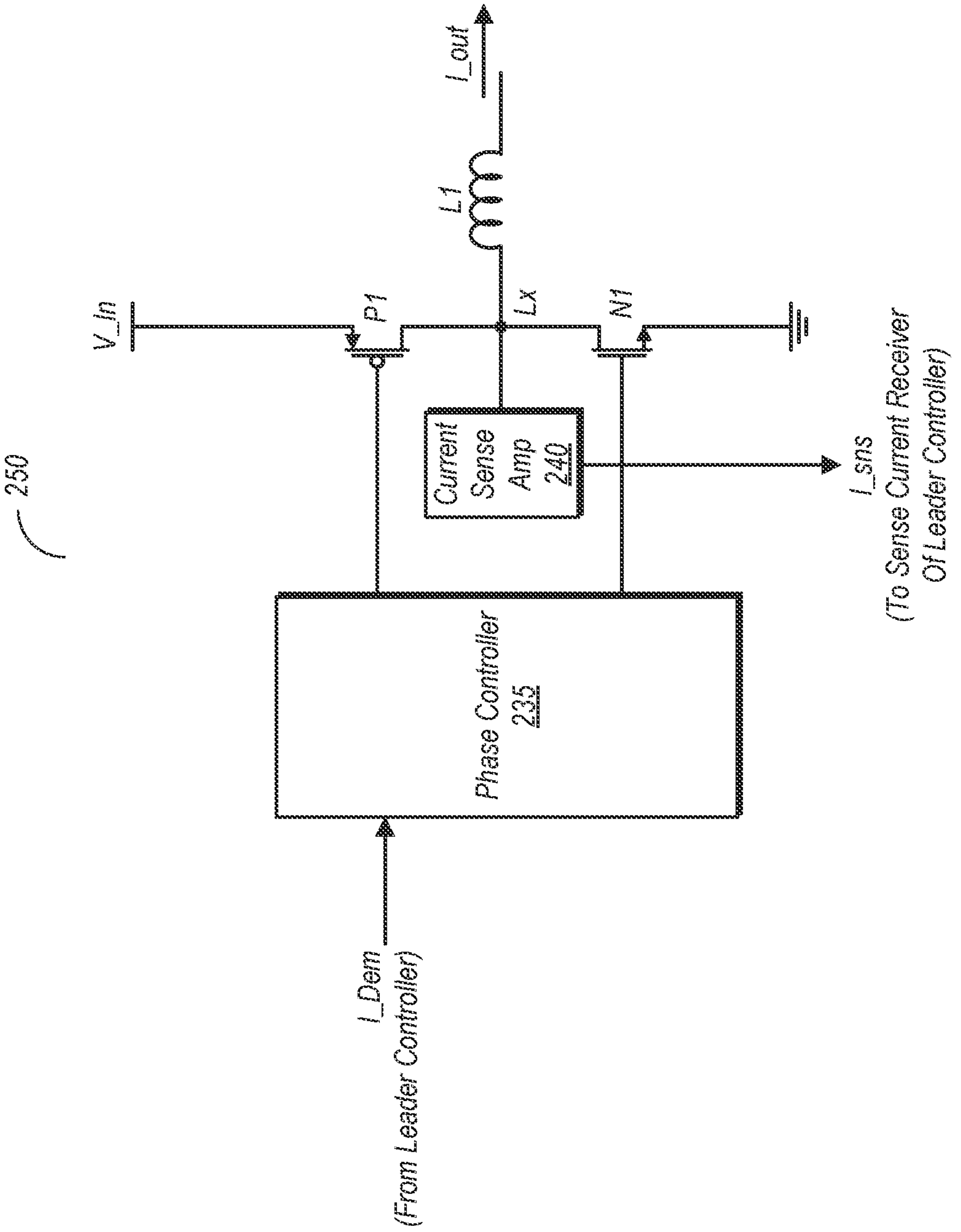
FIG. 2B is a diagram illustrating an example of a phase used in one embodiment of a power converter.

FIG. 2B is a diagram illustrating an example of a phase used in one embodiment of a power converter. In the embodiment shown, phase circuit 250 includes a phase controller 235, a high side switch P1, a low side switch N1, an inductor L1, and a current sense amplifier 240. It is noted that phase circuit 250 is but one example of a phase circuit that may be used with the power converters of the present disclosure, and that other embodiments are possible and contemplated.

Phase controller 235 in the embodiment shown is coupled to receive a demand current value, I_Dem, from a leader controller, which is the control circuit of the power converter with which it is operating. The leader controller may be the control circuit of the power converter to which phase circuit 250 is assigned by default, or may be that of another power converter to which it is reassigned. When reassigned to another power converter, the demand current value is received via a demand current bus.

Based on the value of the I_Dem input, phase controller 235 may cause operation of the high-side and low-side switches in accordance with a particular mode and particular parameters in order that it may provide the desired output current. Phase controller 235 may operate by alternately activating and deactivating the high side and low side switches, P1 and N1, respectively, in, e.g., a PFM mode or a PWM mode. In doing so, phase controller 235 may change the frequency and/or the duty cycle of the switching as necessary to achieve the desired output current.

Current sense amplifier 240 in the embodiment shown is configured to measure the current through inductor L1. This inductor current is then reported as I_sns, and is conveyed to a leader controller, which may be either the control circuit of its default power converter, or the control circuit of another power converter to which it is reassigned. When phase circuit 250 is assigned to another power converter other than its default, the I_sns value may be conveyed via a sense current bus.

Figure 3:
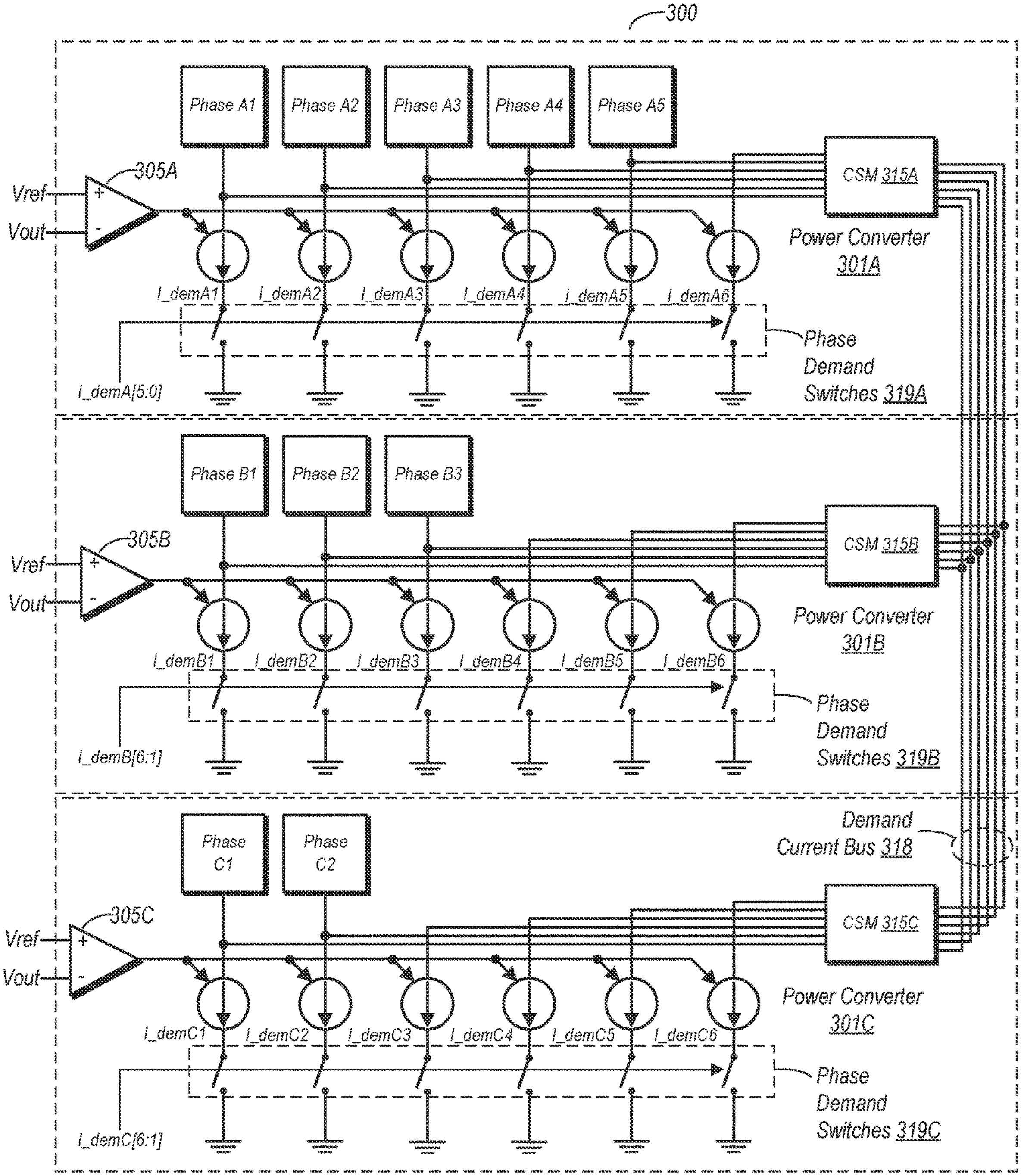
FIG. 3 is a diagram illustrating a demand current bus used for sharing phases among a plurality of power converters.

Analog Buses for Power Converters with Shareable Phases:

FIG. 3 is a diagram illustrating a demand current bus used for sharing phases among a plurality of power converters. Demand current bus 318 is one of two analog buses used in various embodiments of the system disclosed herein in which phases of different power converters are shared with each other.

In the embodiment shown, power converters 301A, 301B, and 301C are coupled to one another by a demand current bus. Power converter 301A includes five phases (Phases A1-A5), power converter 301B includes three phases (Phases B1-B3), and power converter 301C includes two phases (Phases C1 and C2). However, in the arrangement shown, each power converter 301 can provide a demand current value from one of a number of sources. Each of the current sources (e.g., I_demA1, I_demB3, etc.) represents a demand current value that is provided to one of the phases depending on which power converter to which it is assigned.

Each of the power converters shown here is coupled to the demand current bus via a corresponding channel selection multiplexer 315. Through channel selection multiplexer 315, a given power converter 301 can receive a demand current value from another power converter or provide a demand current value to another power converter 301.

Within a given power converter 301, the demand current value is generated by an error amplifier 305A, with the demand current value corresponding to a difference between the output voltage, Vout, and a reference voltage, Vref, of the particular power converter 301. This value may be provided to each of the phases shown in that power converter 301, which may generate a current that corresponds to the output of the error amplifier. For example, when Phase A1 is assigned to its default power converter, 301A, it receives the demand current value I_demA. On the other hand, when Phase A1 is assigned to either of power converters 301B or 301C, it receives a demand current value from that power converter, via a connection to demand current bus 318 through channel select multiplexer 315A.

The extra (not associated with a phase circuit) current sources shown in each of the power converters 301 are indicative of connections to the demand current bus to phase circuits of other ones of power converters 301 when their respective phase circuits are assigned thereto. Consider for example, a situation where power converter 301C (which includes only two phases) has an extra phase assigned thereto from power converter 301A and another phase assigned thereto from power converter 301B. In such a situation, the instance of the demand current value represented by current source I_demC3 could by conveyed, via demand current buts 318 and channel select multiplexers 315C and 315B to the reassigned phase of power converter 301B. In the same situation, the instance of the demand current value represented by I_demC4 could be conveyed by demand current bus 318 and channel select multiplexers 315C and 315A to the reassigned phase of power converter 301A. Generally speaking, the use of demand current bus 318 and the channel select multiplexers 315A-315C allow a demand current value generated in one of power converters 301A-301C to be conveyed to a phase circuit in any one of power converters 301A-301C.

In some cases, a demand current value may be provided to two or more phases of another power converter 301. For example, if two or more extra phases are reassigned to power converter 301A, the demand current value represented by the current source I_demA6 could be provided to both of those phases via the demand current bus 318 and the corresponding channel select multiplexers 315.

In some cases, an instance of a demand current value may not be needed at a given time. For example, if no phases are re-assigned from any power converter and power converter 301A is operating in a condition where less than its full complement of phases are needed to ensure regulation of the output voltage, a corresponding one of the phase demand switches 319A may be opened by a corresponding one of the signals I_demA[5:0].

As previously noted, the demand current values conveyed to the various phases of a given power converter 301 may be used by respective phase controller to set the operating mode and parameters for that phase. Accordingly, through the use of channel selection multiplexers 315 and the demand current bus 318, a control circuit for a leader power converter may set the operating mode and parameters for follower phases in another power converter.

Figure 4:
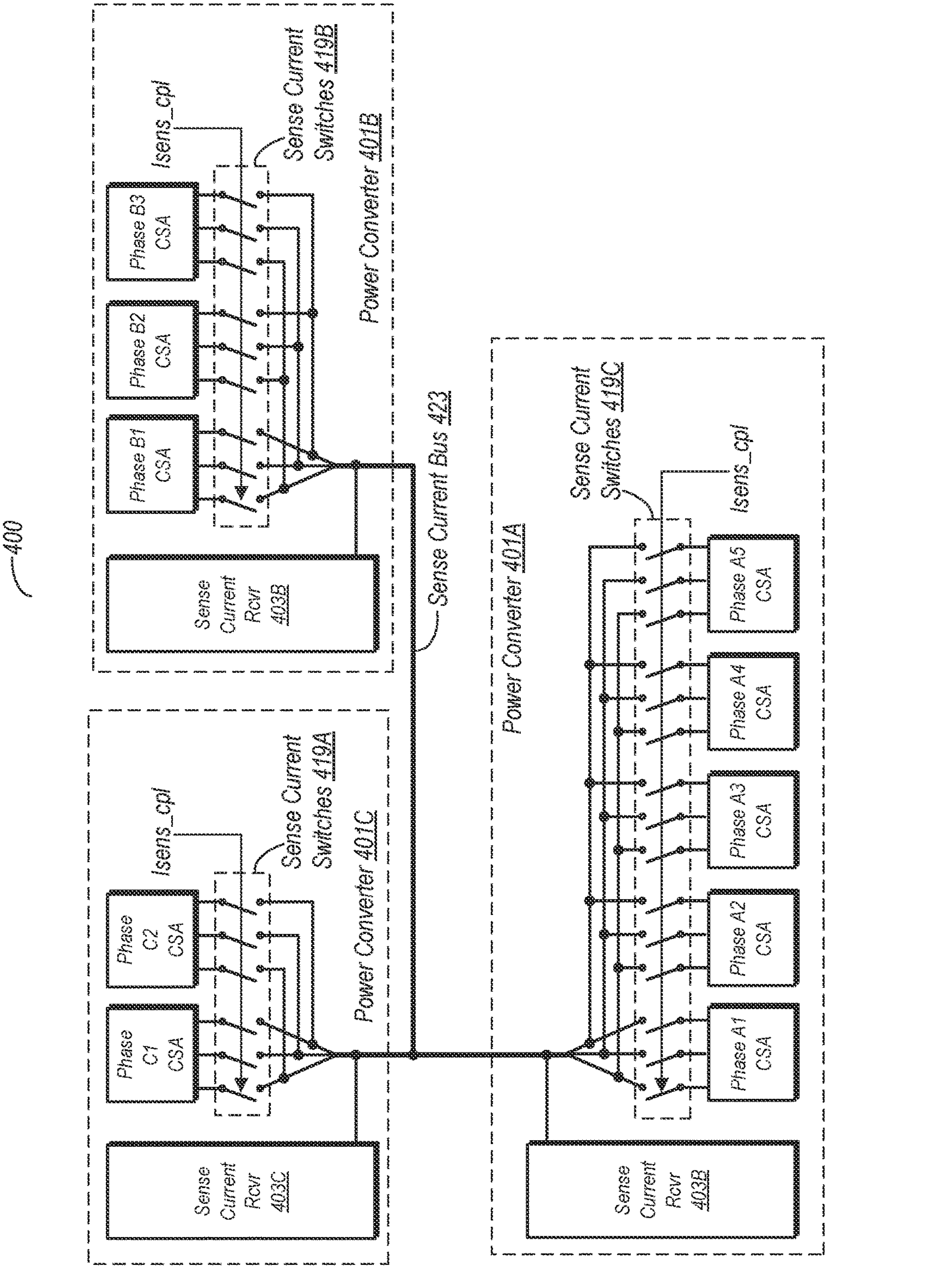
FIG. 4 is a diagram illustrating a sense current bus used for sharing phases among a plurality of power converters.

FIG. 4 is a diagram illustrating a sense current bus used for sharing phases among a plurality of power converters. In the embodiment shown, sense current bus 423 is another analog bus used in various embodiment of the system disclosed herein which enables the sharing of phases among different power converters.

In the embodiment shown, power converter 401A includes five phases, power converter 401B includes three phases, and power converter 401C includes two phases. Each of the phases includes a current sense amplifier (CSA) which is configured to sense the current through its corresponding inductor, such as in the embodiment shown in FIG. 2B.

Each of the power converters 401 shown here includes a sense current receiver circuit 403 that is coupled to the sense current bus 423. The sense current receiver 403 of each power converter 401 may receive sense currents from all phases that are assigned to that power converter 401, including both default and follower phases. These currents may be summed, with the sum providing an indication of the number of phases needed. For example, if the sum of the sense currents in a given power converter is significantly less than its demand current, the sense current value may thus indicate that additional phases are needed to make up this deficit. On the other hand, if the sum of the sense currents in a given power converter 401 is significantly greater than the demand current, the power converter 401 may shed some phases, including returning any borrowed phases to their default power converters.

In the illustrated embodiment, each current sense amplifier of a given phase is coupled to three different ones of current sense switches 419. Each group of three current sense switches 419 coupled to a corresponding current sense amplifier of a given phase effectively forms a one-hot multiplexer. At any given time, one of the switches may be closed while the others are open. The destination of an inductor current sensed by a current sense amplifier thus depends on which of its three switches is closed. For example, a phase in power converter 401A may, depending on which switch is closed, provide its sensed inductor current to its own sense current receiver 403A, the sense current receiver 403B of power converter 401B, or the sense current receiver 403C of power converter 401C. The sense current value may be conveyed on sense current bus 423 to the selected sense current receiver 403.

Figure 5:
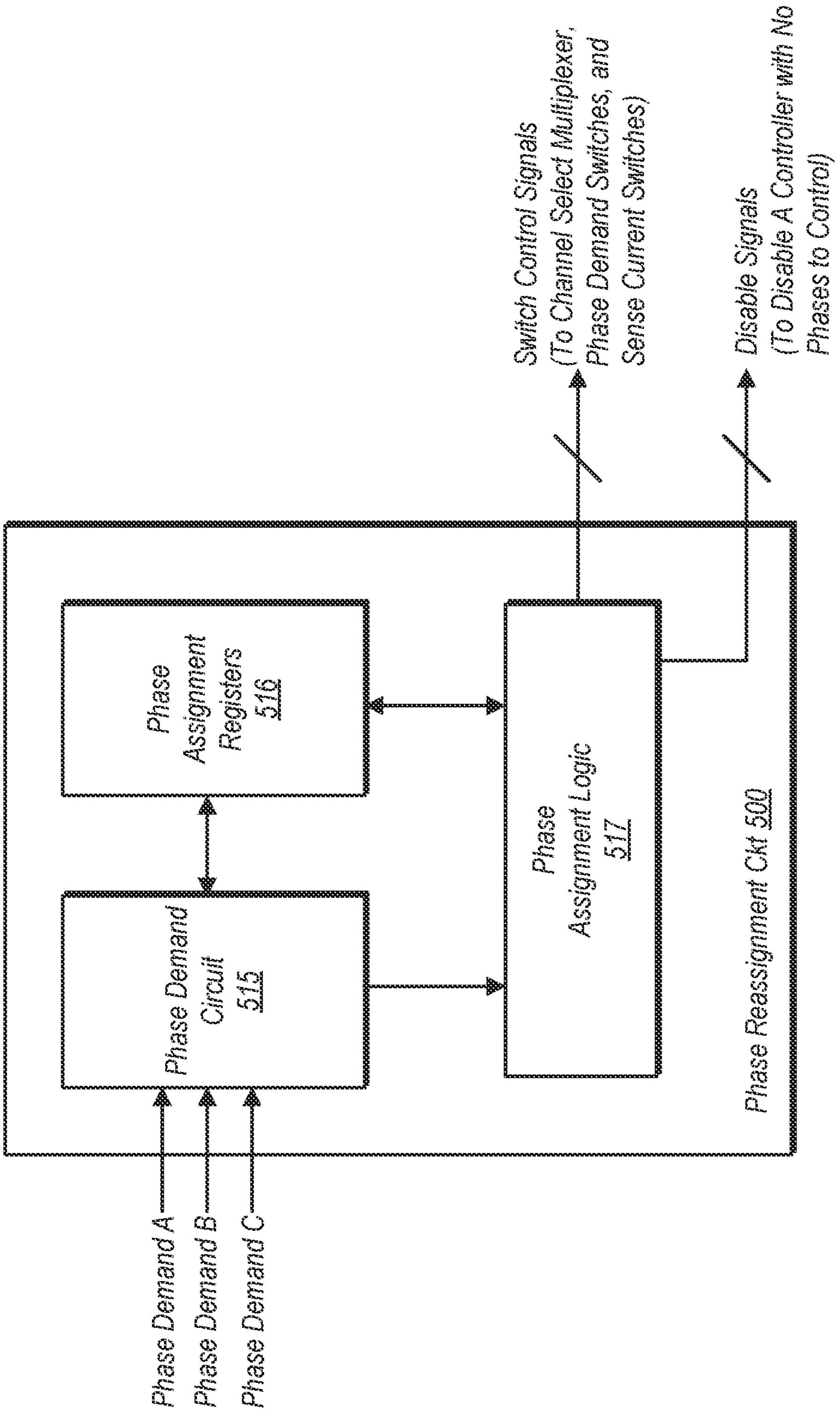
FIG. 5 is a block diagram illustrating one embodiment of a phase reassignment circuit.

Phase Reassignment Circuit:

FIG. 5 is a block diagram illustrating one embodiment of a phase reassignment circuit. In the embodiment shown, phase reassignment circuit 500 includes a phase demand circuit 515, phase assignment registers 516, and phase assignment logic 517.

Phase assignment registers 516 in the embodiment shown are configured to store information regarding the various phases of each of the power converters in the group for which phases may be shared. The information may indicate whether a given phase is assigned to its default power converter, which power converter for which it is a follower (when shared with another power converter), or currently inactive.

The phase demand circuit 515 is coupled to receive phase demand signals from each of the power converters, which may be generated by circuitry internal to their corresponding control circuits, using the demand current and sensed inductor currents. The phase demand signals may, in one embodiment, indicate a difference between a demand current and a sensed current for each power converter. In another embodiment, the phase demand signals may indicate the amount of current needed to maintain regulation for their respective power converters. Still, in another embodiment, Using the information contained in the phase demand signals and information stored in the phase assignment registers 516, the phase demand circuit 515 may generate assignments for any phases that are needed. This information is provided to the phase assignment logic 517, which translates the phase assignments into switch control signals. These switch control signals may be used to operate the various switches of the channel select multiplexers and phase demand switches (to enable demand currents to be conveyed on the command bus) as well as the sense demand switches (to couple sense current amplifiers to sense current receivers via the sense current bus). The switch signal may also be used to couple outputs of the various phase circuits to their assign power converter, whether it be their default power converter or as a follower of another power converter.

Figure 6:
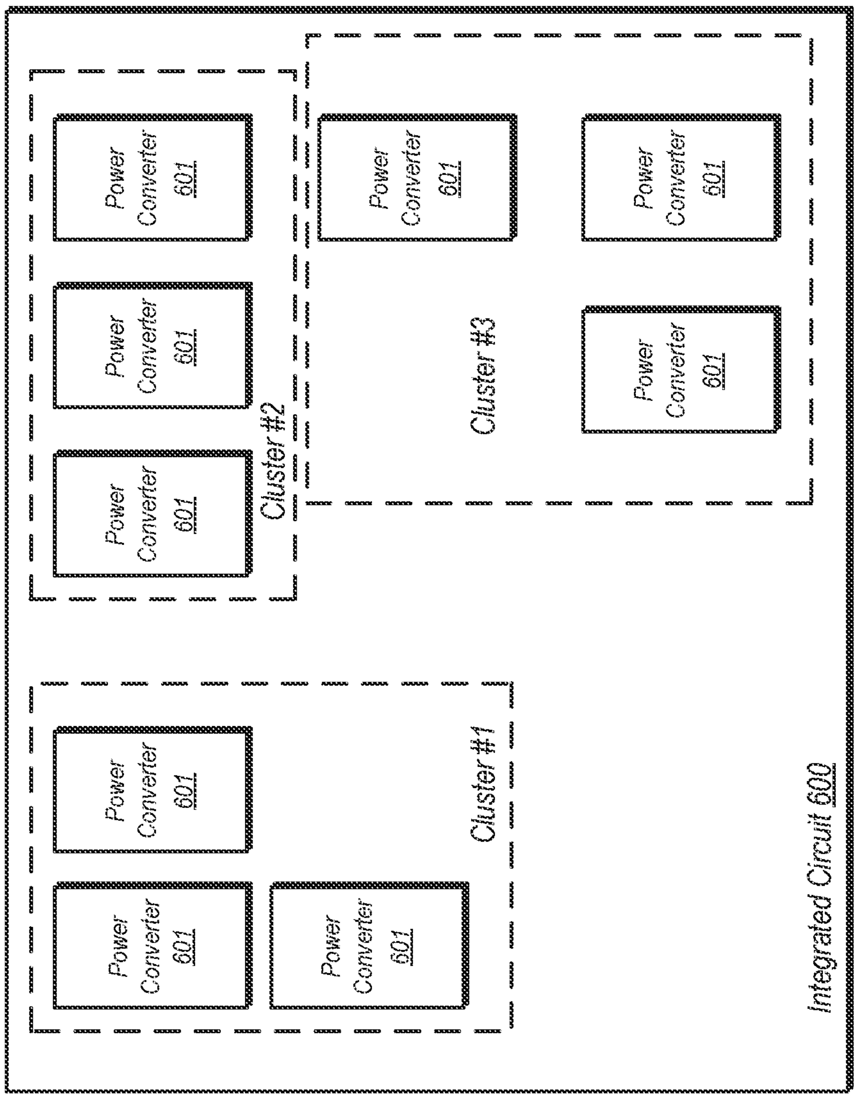
FIG. 6 is a diagram of one embodiment of an integrated circuit having a plurality of power converters configured for sharing phases.

Integrated Circuit with Power Converter Clusters:

FIG. 6 is a diagram of one embodiment of an integrated circuit having a plurality of power converters configured for sharing phases. In the embodiment shown, integrated circuit 600 includes three clusters each having three power converters 601. The power converters of a given cluster may be arranged on the integrated circuit such that they are in relatively close physical proximity to one another. Each of the power converters in the embodiment shown is a multi-phase switching power converter, although it is noted that other power converter types (e.g., low dropout, or LDO voltage regulators) may be implemented on the same IC. Within a given cluster of the multi-phase power converters, the phases may be shared in accordance with the discussion above. Accordingly, a given cluster may also include a phase reassignment circuit as well as demand current bus, a sense current bus, and circuitry to couple the outputs of the phases to one another to enable a given phase to operate with any one of the power converters within that cluster.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types.

Embodiments implemented using Bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

Figure 7:
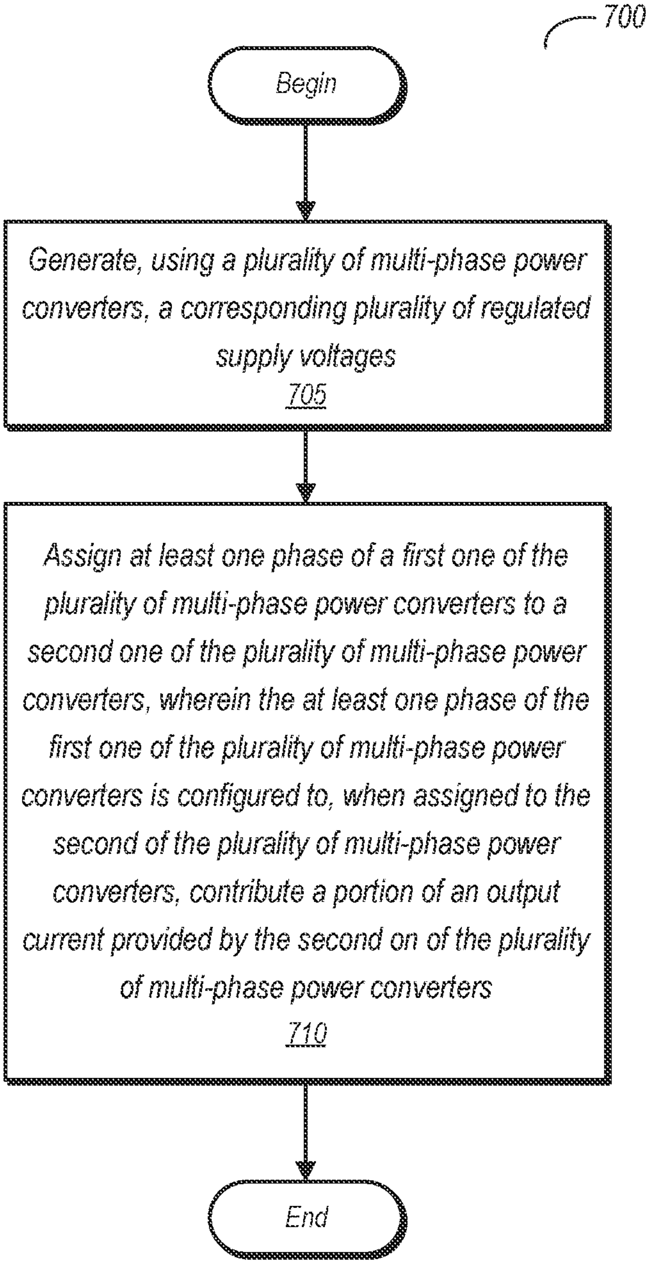
FIG. 7 is a flow diagram of one embodiment of a method for operating a plurality of power converters with sharable phases.

Method of Operation:

FIG. 7 is a flow diagram of one embodiment of a method for operating a plurality of power converters with sharable phases. Method 700 may be carried out by any of the various embodiments discussed herein that are directed to sharing phases among a plurality of different power converters. Embodiments not explicitly discussed herein but capable of carrying out Method 700 also fall within the scope of this disclosure.

Method 700 includes generating, using a plurality of multi-phase power converters, a corresponding plurality of regulated supply voltages (block 705). The method further includes reassigning phases from their default power converter to another power converter within the plurality of power converters. This includes assigning at least one phase of a first one of the plurality of multi-phase power converters to a second one of the plurality of multi-phase power converters, wherein the at least one phase of the first one of the plurality of multi-phase power converters is configured to, when assigned to the second of the plurality of multi-phase power converters, contribute a portion of an output current provided by the second on of the plurality of multi-phase power converters (block 710).

In various embodiments, the method includes assigning, using the phase reassignment circuit, at least one phase circuit of a third one of the plurality of multi-phase power converters to the second one of the plurality of multi-phase power converters. Some embodiments of the method includes conveying, via a demand current bus, a demand current value from the second one of the multi-phase power converters to the first one of the multi-phase power converters, and providing, via a sense current bus, a sense current value from a phase circuit of the first one of the plurality of multi-phase power converters to a sense current receiver in the second one of the plurality of multi-phase power converters. Embodiments of the method that include generating, using a sense current amplifier in the phase circuit of the first one of the plurality of multi-phase power converters, the sense current value are also possible and contemplated. The disclosure further contemplates embodiments of the method that include disabling, using the phase reassignment circuit, a control circuit corresponding to one of the plurality of multi-phase power converters in response to determining that all phase circuits of the one of the multi-phase power converters are assigned to provide respective output currents to other ones of the plurality of multi-phase power converters.

Figure 8:
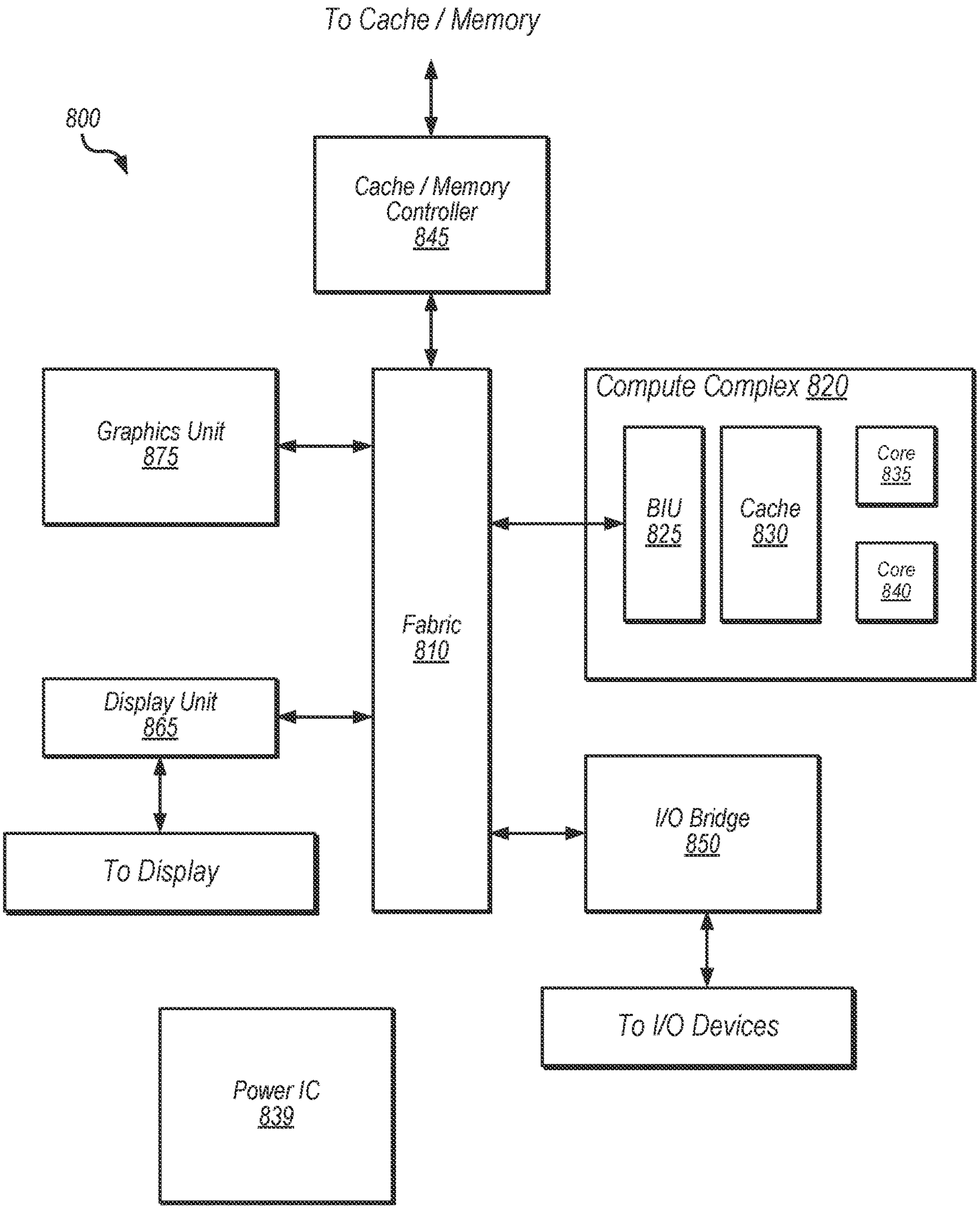
FIG. 8 is a block diagram of one embodiment of an example device.

Example Device:

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc. A power IC 839 includes a plurality of power converters, at least some of which are coupled to provide a regulate supply voltage to the other components illustrated herein. Some of these power converters are multi-phase switching power converters, and may be arranged in clusters as shown in FIG. 6, with the phases of the various power converters within a given cluster being sharable in accordance with the discussion above.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions. These instructions may be stored in computer readable medium such as a memory coupled to memory controller 845 discussed below.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches. Memory coupled to controller 845 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 845 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 820 to cause the computing device to perform functionality described herein.

Graphics unit 875 may include one or more processors, e.g., one or more graphics processing units (GPUs). Graphics unit 875 may receive graphics-oriented instructions, such as OPENGL®, Metal®, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 800 with connectivity to various types of other devices and networks.

Example Applications

Figure 9:
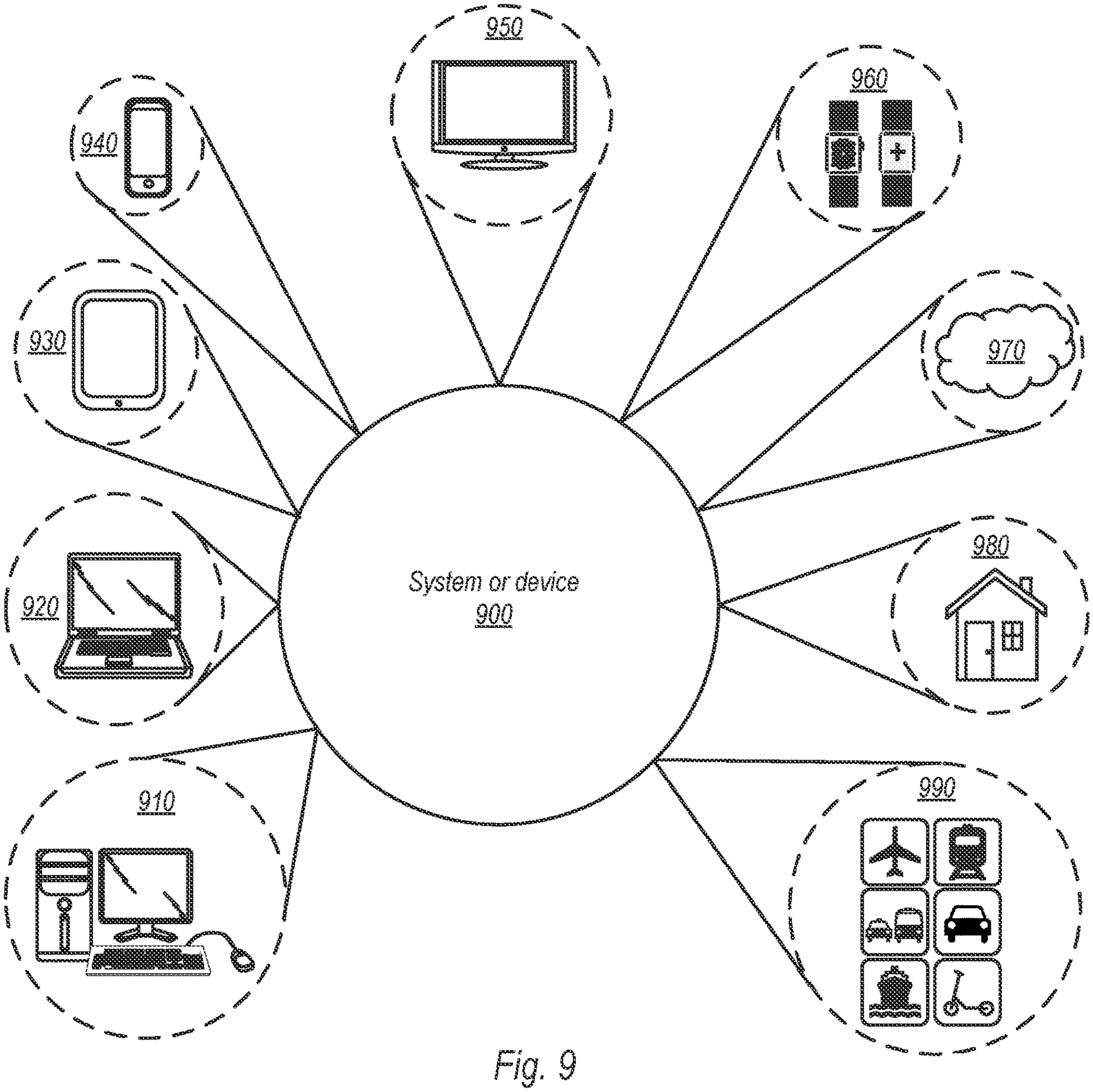
FIG. 9 is a diagram illustrating various embodiments of a system in which the circuits of the disclosure may be implemented.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc. The disclosure also contemplates applications including head-mounted devices, dual-display devices, other types of wearable devices not otherwise mentioned above, and various types of multimedia devices.

Example Computer-Readable Medium:

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 10:
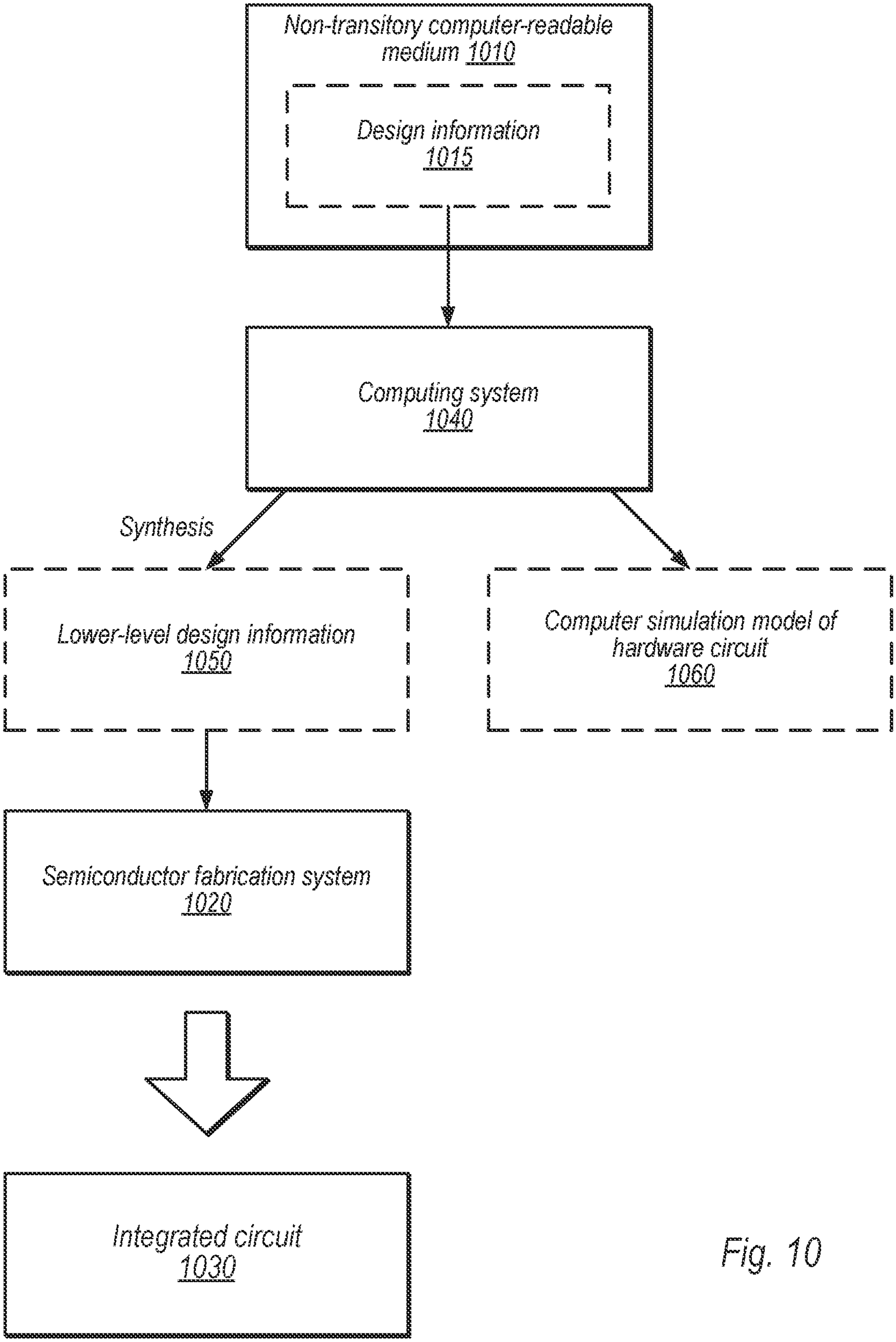
FIG. 10 is a block diagram of one embodiment of a computer readable medium usable for manufacturing an integrated circuit.

FIG. 10 is a block diagram illustrating an example non-transitory computer-readable storage medium that stores circuit design information, according to some embodiments. In the illustrated embodiment, computing system 1040 is configured to process the design information. This may include executing instructions included in the design information, interpreting instructions included in the design information, compiling, transforming, or otherwise updating the design information, etc. Therefore, the design information controls computing system 1040 (e.g., by programming computing system 1040) to perform various operations discussed below, in some embodiments.

In the illustrated example, computing system 1040 processes the design information to generate both a computer simulation model of a hardware circuit 1060 and lower-level design information 1050. In other embodiments, computing system 1040 may generate only one of these outputs, may generate other outputs based on the design information, or both. Regarding the computing simulation, computing system 1040 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1040 also processes the design information to generate lower-level design information 1050 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1050 (potentially among other inputs), semiconductor fabrication system 1020 is configured to fabricate an integrated circuit 1030 (which may correspond to functionality of the simulation model 1060). Note that computing system 1040 may generate different simulation models based on design information at various levels of description, including information 1050, 1015, and so on. The data representing design information 1050 and model 1060 may be stored on medium 1010 or on one or more other media.

In some embodiments, the lower-level design information 1050 controls (e.g., programs) the semiconductor fabrication system 1020 to fabricate the integrated circuit 1030. Thus, when processed by the fabrication system, the design information may program the fabrication system to fabricate a circuit that includes various circuitry disclosed herein.

Non-transitory computer-readable storage medium 1010, may comprise any of various appropriate types of memory devices or storage devices. Non-transitory computer-readable storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Accordingly, non-transitory computer-readable storage medium 1010 may include two or more memory media; such media may reside in different locations—for example, in different computer systems that are connected over a network.

Design information 1015 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1040, semiconductor fabrication system 1020, or both. In some embodiments, design information may also include one or more cell libraries that specify the synthesis, layout, or both of integrated circuit 1030. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1030 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 and model 1060 are configured to operate according to a circuit design specified by design information 1015, which may include performing any of the functionality described herein. For example, integrated circuit 1030 may include any of various elements shown in FIGS. 1, 2A-2B, and 3-6. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1020 to fabricate integrated circuit 1030.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:

a plurality of power converters, wherein ones of the plurality of power converters are multi-phase power converters configured to generate a corresponding one of a plurality of regulated supply voltages, the plurality of power converters comprising:

a first power converter having a first plurality of phase circuits, wherein the first power converter is configured to provide a first output current; and a second power converter having a second plurality of phase circuits, wherein the second power converter is configured to provide a second output current; and a phase reassignment circuit configured to:

cause one or more selected ones of the first plurality of phase circuits to be reassigned to provide a portion of the second output current from the second power converter and further configured to cause one or more selected ones of the second plurality of phase circuits to provide a portion of the first output current from the first power converter, and disable a control circuit of a given one of the plurality of power converters in response to determining that all phase circuits of the given one of the plurality of power converters are assigned to provide output current to other ones of the plurality of power converters.

2. The apparatus of claim 1, wherein the plurality of power converters includes a third power converter having a third plurality of phase circuits, wherein the phase reassignment circuit is configured to reassign one or more selected ones of the third plurality of phase circuits to contribute output current to one of the first or second output currents.

3. The apparatus of claim 2, wherein the third power converter is configured to provide a third output current, and wherein the phase reassignment circuit is further configured to reassign one or more selected ones of the first and second plurality of phase circuits to contribute to the third output current.

4. The apparatus of claim 2, further comprising a demand current bus coupled between the first, second and third power converters, wherein a given phase circuit of the first, second, and third pluralities of phase circuits is configured to convey a corresponding demand current value, via the demand current bus, to a phase circuit in another one of the first, second and third plurality of phase circuits.

5. The apparatus of claim 2, wherein the first, second, and third power converters further include corresponding sense current receivers.

6. The apparatus of claim 5, wherein ones of the first, second and third pluralities of phase circuits include a corresponding current sense amplifier configured to sense a current through a corresponding inductor, wherein the corresponding current sense amplifier of a given one of the first, second, and third plurality of phase circuits is configured to provide, via a sense current bus, an output from the corresponding current sense amplifier to the corresponding current sense receiver of a one of the first, second, and third power converters to which it is assigned.

7. The apparatus of claim 1, wherein a given one of the plurality of regulated supply voltages is different from other ones of the plurality of regulated supply voltages.

8. The apparatus of claim 7, wherein, when a given one of the plurality of power converters is receiving a contribution to its output current from another one of the plurality of power converters, the given one of the plurality of power converters determines a one of the plurality of regulated supply voltages provided therefrom.

9. The apparatus of claim 1, wherein ones of the plurality of power converters include a corresponding one of a plurality of control circuits, wherein ones of the plurality of control circuits include a corresponding one of a plurality of error amplifiers.

10. The apparatus of claim 9, wherein a given one of the plurality of control circuits is configured to control a switching mode, a switching frequency, and a duty cycle for all phase circuits assigned to a corresponding one of the plurality of power converters.

11. A method comprising:

generating, using a plurality of multi-phase power converters, a corresponding plurality of regulated supply voltages;

assigning, using a phase reassignment circuit, at least one phase circuit of a first one of the plurality of multi-phase power converters to a second one of the plurality of multi-phase power converters, wherein the at least one phase circuit of the first one of the plurality of multi-phase power converters is configured to, when assigned to the second one of the plurality of multi-phase power converters, contribute a portion of an output current provided by the second one of the plurality of multi-phase power converters; and disabling, using the phase reassignment circuit, a control circuit corresponding to one of the plurality of multi-phase power converters in response to determining that all phase circuits of the one of the multi-phase power converters are assigned to provide respective output currents to other ones of the plurality of multi-phase power converters.

12. The method of claim 11, further comprising assigning, using the phase reassignment circuit, at least one phase circuit of a third one of the plurality of multi-phase power converters to the second one of the plurality of multi-phase power converters.

13. The method of claim 11, further comprising conveying, via a demand current bus, a demand current value from the second one of the multi-phase power converters to the first one of the multi-phase power converters.

14. The method of claim 11, further comprising providing, via a sense current bus, a sense current value from a phase circuit of the first one of the plurality of multi-phase power converters to a sense current receiver in the second one of the plurality of multi-phase power converters.

15. The method of claim 14, further comprising generating, using a sense current amplifier in the phase circuit of the first one of the plurality of multi-phase power converters, the sense current value.

16. The method of claim 11, further comprising assigning, using the phase reassignment circuit, at least one phase circuit of a third one of the plurality of multi-phase power converters to one of the first one or the second one of the plurality of multi-phase power converters.

17. An apparatus comprising:

a plurality of power converters, wherein a given one of the plurality of power converters is configured to provide a corresponding regulated supply voltage and includes a corresponding plurality of phase circuits configured to provide a portion of an output current provided by the given one of the plurality of power converters;

a plurality of switching circuits coupled between corresponding ones of the plurality of phase circuits of the plurality of power converters; and a phase reassignment circuit configured to:

using ones of the plurality of switching circuits, cause one or more phase circuits of the given one of the plurality of power converters to provide a portion of an output current generated by another one of the plurality of power converters, and disable a control circuit of the given one of the plurality of power converters in response to determining that all phase circuits of the given one of the plurality of power converters are assigned to provide output current to other ones of the plurality of power converters.

18. The apparatus of claim 17, further comprising a sense current bus coupled between ones of the plurality of power converters, wherein the given one of the plurality of power converters includes a control circuit coupled to receive a sense current value via the sense current bus, wherein the control circuit is configured to, based on the sense current value, determine a number of phase circuits needed to enable regulation of a correspondingly generated output voltage.

19. The apparatus of claim 17, further comprising a demand current bus, wherein a control circuit of the given one of the plurality of power converters is configured to provide a demand current value, via the demand current bus, to the phase reassignment circuit.

20. The apparatus of claim 17, wherein:

the plurality of power converters includes a first power converter, a second power converter and a third power converter; and the phase reassignment circuit is further configured to cause one or more phase circuits of the third power converter to provide a portion of an output generated by one of the first power converter or the second power converter.

* * * * *